United States Patent
DeLaquil et al.

(10) Patent No.: US 8,577,949 B2
(45) Date of Patent: Nov. 5, 2013

(54) SYSTEM FOR CONJUGATE GRADIENT LINEAR ITERATIVE SOLVERS

(75) Inventors: Matthew P. DeLaquil, Rockwall, TX (US); Deepak Prasanna, Rockwall, TX (US); Antone L. Kusmanoff, Greenville, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 1074 days.

(21) Appl. No.: 12/498,800

(22) Filed: Jul. 7, 2009

(65) Prior Publication Data

US 2011/0010409 A1    Jan. 13, 2011

(51) Int. Cl.
G06F 7/48 (2006.01)
G06F 7/00 (2006.01)
G06F 7/38 (2006.01)
G06F 17/14 (2006.01)
G06F 7/32 (2006.01)
G06F 7/52 (2006.01)
G06F 7/60 (2006.01)

(52) U.S. Cl.
USPC ........... 708/520; 708/190; 708/200; 708/230; 708/400; 708/446; 708/607; 703/2

(58) Field of Classification Search
USPC ................. 708/200, 400, 446, 607, 839, 520; 370/335; 703/2; 382/128
See application file for complete search history.

(56) References Cited

U.S. PATENT DOCUMENTS

| | | | | |
|---|---|---|---|---|
| 4,566,077 A | * | 1/1986 | Schuocker et al. | 708/839 |
| 4,914,615 A | * | 4/1990 | Karmarkar et al. | 708/607 |
| 5,506,865 A | * | 4/1996 | Weaver, Jr. | 370/335 |
| 5,604,911 A | * | 2/1997 | Ushiro | 703/2 |
| 6,175,911 B1 | * | 1/2001 | Oberman et al. | 712/221 |
| 8,200,735 B2 | * | 6/2012 | Inoue | 708/607 |
| 2005/0078861 A1 | * | 4/2005 | Usikov | 382/131 |
| 2008/0010329 A1 | * | 1/2008 | Kuwada | 708/200 |
| 2008/0063247 A1 | * | 3/2008 | Griswold | 382/128 |
| 2009/0248778 A1 | * | 10/2009 | Magerlein | 708/520 |
| 2010/0011040 A1 | * | 1/2010 | Vannucci | 708/400 |

OTHER PUBLICATIONS

Andrzej Jordan and Robert Piotr Bycul. "The Parallel Algorithm of Conjugate Gradient Method." D. Grigoras et al. (Eds.): IWCC 2001, LNCS 2326, pp. 156-165, 2002. Found at <http://www.springerlink.com/content/jm9584vqued7du38/> (Jul. 27, 2012).*

(Continued)

*Primary Examiner* — Farley Abad
*Assistant Examiner* — Henry Yu
(74) *Attorney, Agent, or Firm* — Hovey Williams LLP (57) ABSTRACT

A system for a conjugate gradient iterative linear solver that calculates the solution to a matrix equation comprises a plurality of gamma processing elements, a plurality of direction vector processing elements, a plurality of x-vector processing elements, an alpha processing element, and a beta processing element. The gamma processing elements may receive an A-matrix and a direction vector, and may calculate a q-vector and a gamma scalar. The direction vector processing elements may receive a beta scalar and a residual vector, and may calculate the direction vector. The x-vector processing elements may receive an alpha scalar, the direction vector, and the q-vector, and may calculate an x-vector and the residual vector. The alpha processing element may receive the gamma scalar and a delta scalar, and may calculate the alpha scalar. The beta processing element may receive the residual vector, and may calculate the delta scalar and the beta scalar.

28 Claims, 4 Drawing Sheets

(56) References Cited

OTHER PUBLICATIONS

Shewchuk, Jonathan Richard, *An Introduction to the Conjugate Gradient Method Without the Agonizing Pain,* Edition 1 1/4 (Aug. 4, 1994).

Morris, Gerald R. et al, *A Hybrid Approach for Mapping Conjugate Gradient onto an FPGA-Augmented Reconfigurable Supercomputer,* 14th Annual IEEE Symposium on Field-Programmable Custom Computing Machines (2006).

* cited by examiner

FIG. 7

SYSTEM FOR CONJUGATE GRADIENT LINEAR ITERATIVE SOLVERS

BACKGROUND OF THE INVENTION

1. Field of the Invention

Embodiments of the present invention relate to high-performance computing. More particularly, embodiments of the present invention relate to a system for a conjugate gradient iterative linear solver that calculates the solution to a matrix equation.

2. Description of the Related Art

Large systems of linear equations may be expressed in the form of the matrix equation: Ax=b. A is a known matrix of size n×n, where n is usually quite large. b is a known vector of size n. x is an unknown vector of size n, for which a solution is desired. The A-matrix is positive-definite, if it satisfies the condition that for every non-zero vector x: $x^T Ax > 0$, where $x^T$ is the transpose of the x-vector. When the A-matrix is positive-definite, the conjugate gradient method of solving the matrix equation may be applied.

Utilizing software techniques and single processor systems to find the solution to the matrix equation typically results in a plurality of calculations that are performed in a serial fashion. These approaches don't take advantage of the possibility that some of the calculations of the conjugate gradient method may be performed in parallel.

SUMMARY OF THE INVENTION

Embodiments of the present invention solve the above-mentioned problems and provide a distinct advance in the art of high-performance computing. More particularly, embodiments of the invention provide a system for a conjugate gradient iterative linear solver that utilizes reconfigurable computing devices to calculate the solution to a matrix equation. The system includes a plurality of processing elements that perform the calculations of the conjugate gradient method in a parallel fashion.

Various embodiments of the system comprise a plurality of field programmable gate arrays (FPGAs), a plurality of gamma processing elements, plurality of direction vector processing elements, a plurality of x-vector processing elements, an alpha processing element, and a beta processing element. The FPGAs may include a plurality of configurable logic elements and a plurality of configurable storage elements from which the various processing elements are formed.

The gamma processing elements may receive an A-matrix and a direction vector, and may calculate a q-vector and a gamma scalar, wherein the q-vector may be a product of the A-matrix and the direction vector, and the gamma scalar may be a dot product of the q-vector and the direction vector.

The direction vector processing elements may receive a beta scalar and a residual vector, and may calculate the direction vector, wherein the direction vector may be a sum of the residual vector and a product of the beta scalar and a previous iteration of the direction vector.

The x-vector processing elements may receive an alpha scalar, the direction vector, and the q-vector, and may calculate an x-vector and the residual vector, wherein the x-vector may be a sum of a previous iteration of the x-vector and a product of the alpha scalar and the direction vector, and the residual vector may be a difference of a previous iteration of the residual vector and a product of the alpha scalar and the q-vector.

The alpha processing element may receive the gamma scalar and a delta scalar, and may calculate the alpha scalar, wherein the alpha scalar may be a quotient of the delta scalar and the gamma scalar.

The beta processing element may receive the residual vector, and may calculate the delta scalar and the beta scalar, wherein the delta scalar may be a dot product of the residual vector with itself, and the beta scalar may be a quotient of a current iteration of the delta scalar and a previous iteration of the delta scalar.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
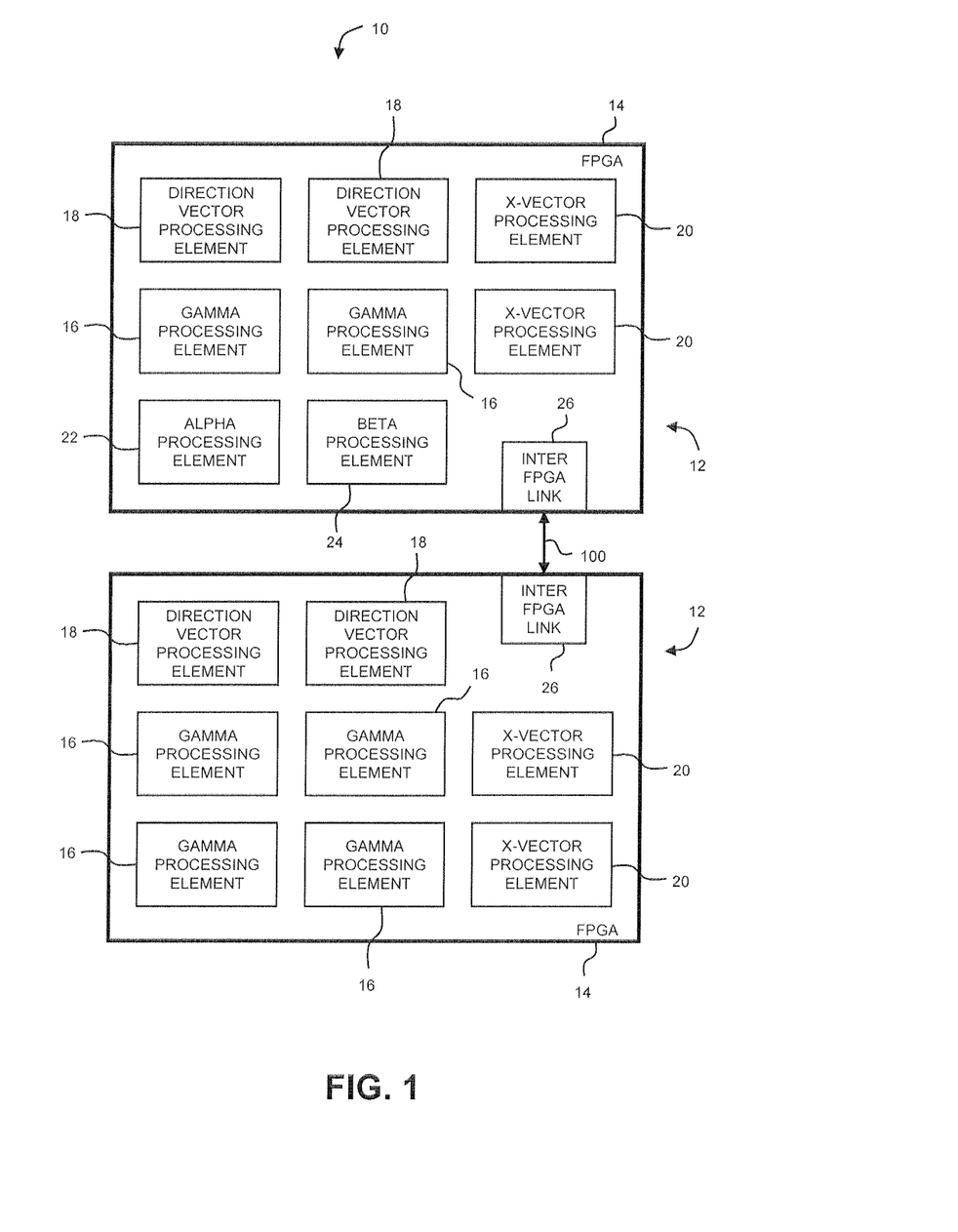
FIG. 1 is a schematic diagram of a system for a conjugate gradient iterative linear solver constructed in accordance with various embodiments of the current invention.

A system 10 for a conjugate gradient iterative linear solver that calculates the solution to a matrix equation is shown in FIG. 1. The system 10 broadly comprises a plurality of reconfigurable computing devices 12, such as field programmable gate arrays (FPGAs) 14, a plurality of gamma processing elements 16, a plurality of direction vector processing elements 18, a plurality of x-vector processing elements 20, an alpha processing element 22, a beta processing element 24, and a plurality of inter FPGA links 26.

The system 10 generally finds the solution to a matrix equation with the form Ax=b, where A is a known n×n matrix (referred to as the "A-matrix"), b is a known vector of size n (referred to as the "b-vector"), and x is an unknown vector of size n (referred to as the "x-vector" or alternatively the "solution vector"). The matrix and the two vectors may all have a total of n rows. For a large scale matrix equation, n may be in the millions. The matrix equation may be expanded as shown in EQ. 1:

$$\begin{bmatrix} A_{11} & A_{12} & \cdots & A_{1n} \\ A_{21} & A_{22} & \cdots & A_{2n} \\ \vdots & \vdots & \ddots & \vdots \\ A_{n1} & A_{n2} & \cdots & A_{nn} \end{bmatrix} \begin{bmatrix} x_1 \\ x_2 \\ \vdots \\ x_n \end{bmatrix} = \begin{bmatrix} b_1 \\ b_2 \\ \vdots \\ b_n \end{bmatrix} \quad \text{EQ. 1}$$

The system 10 employs the conjugate gradient method of finding a solution. The method may start with an initial guess of the x-vector, $x^{(0)}$, and may cycle through a number of iterations (i=0, 1, 2, ...) of calculations that update the initial guess. The method may also include the following additional initial conditions:

$$r^{(0)} = b - Ax^{(0)} \quad \text{EQ. 2}$$

wherein $r^{(0)}$ is an initial value of a residual vector, b is the b-vector of EQ. 1, A is the matrix of EQ. 1, and is the initial guess of the x-vector.

$$\delta_0 = r^{(0)} \cdot r^{(0)} \quad \text{EQ. 3}$$

wherein $\delta_0$ is an initial value of a first scalar, which is the dot product of $r^{(0)}$, the initial value of the residual vector.

The method may also iterate through the following equations.

$$d^{(i)} = r^{(i)} + \beta_{i-1} d^{(i-1)} \quad \text{EQ. 4}$$

wherein $d^{(i)}$ is the current iteration of a directional vector, $r^{(i)}$ is the current iteration of the residual vector, $\beta_{i-1}$ (beta) is the last iteration of a second scalar, and $d^{(i-1)}$ is the last iteration of the directional vector.

$$q^{(i)} = A d^{(i)} \quad \text{EQ. 5}$$

wherein $q^{(i)}$ is the current iteration of a matrix-vector product, A is the matrix of EQ. 1, $d^{(i)}$ is the current iteration of the directional vector, and i is the iteration of the calculation.

$$\gamma_i = q^{(i)} \cdot d^{(i)} \quad \text{EQ. 6}$$

wherein $\gamma_i$ (gamma) is the current iteration of a third scalar equal to the dot product of the current iteration of q and the current iteration of d.

$$\alpha_i = \delta_i / \gamma_i \quad \text{EQ. 7}$$

wherein $\alpha_i$ is the current iteration of the fourth scalar, $\delta_i$ is the current iteration of the first scalar, and $\gamma_i$ is the dot product from EQ. 6.

$$r^{(i)} = r^{(i-1)} - \alpha_{i-1} q^{(i-1)} \quad \text{EQ. 8}$$

wherein $r^{(i)}$ is the current iteration of the residual vector, $r^{(i-1)}$ is the last iteration of the residual vector, $\alpha_{i-1}$ is the last iteration of the fourth scalar, and $q^{(i-1)}$ is the last iteration of the matrix-vector product from EQ. 5.

$$\delta_i = r^{(i)} \cdot r^{(i)} \quad \text{EQ. 9}$$

wherein $\delta_i$ is the current iteration of the first scalar, which is equal to the dot product of the current iteration of the residual vector $r^{(i)}$ with itself.

$$\beta_i = \delta_i / \delta_{i-1} \quad \text{EQ. 10}$$

wherein $\beta_i$ (beta) is the current iteration of the second scalar, that is equal to the current iteration of the first scalar, $\delta_i$, divided by the last iteration, $\delta_{i-1}$, which corresponds to the change in the first scalar from the last iteration to the current iteration.

$$x^{(i)} = x^{(i-1)} + \alpha_{i-1} d^{(i-1)} \quad \text{EQ. 11}$$

wherein $x^{(i)}$ is the current iteration of the x-vector, $x^{(i-1)}$ the x-vector from the last iteration, $\alpha_{i-1}$ (alpha) is the last iteration of a fourth scalar, and $d^{(i-1)}$ is the last iteration of the d vector. The criteria for convergence, or when to stop iterating, may be related to the magnitude of the residual vector, $r^{(i)}$, and may be determined outside of the system 10.

Figure 2:
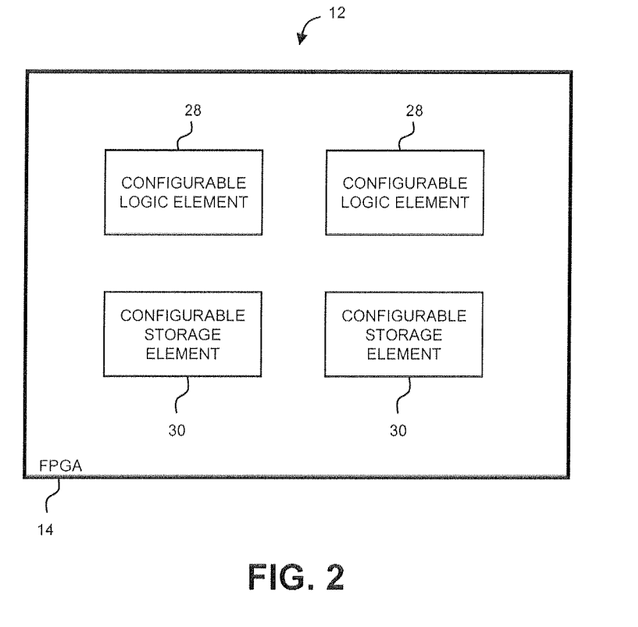
FIG. 2 is a schematic diagram of a field programmable gate array that may be incorporated in the system of FIG. 1.

The FPGA 14 generally provides the resources to implement the gamma processing elements 16, the direction vector processing elements 18, the x-vector processing elements 20, the alpha processing element 22, the beta processing element 24, and the inter FPGA links 26. The FPGA 14, as seen in FIG. 2, may include configurable logic elements 28 or blocks, such as standard gate array components that include combinational logic gates (e.g., AND, OR, and NOT) and latches or registers, programmable switch and interconnect networks, configurable storage elements 30 such as random-access memory (RAM) components, and input/output (I/O) pads. The FPGA 14 may also include specialized functional blocks such as arithmetic/logic units (ALUs) that include high-performance adders and multipliers, or communications blocks for standardized protocols. An example of the FPGA 14 is the Xilinx Virtex™ series, particularly the Virtex™2Pro FPGA, from Xilinx, Inc. of San Jose, Calif.

The FPGA 14 may be programmed in a generally traditional manner using electronic programming hardware that couples to standard computing equipment, such as a workstation, a desktop computer, or a laptop computer. The functional description or behavior of the circuitry may be programmed by writing code using a hardware description language (HDL), such as very high-speed integrated circuit hardware description language (VHDL) or Verilog, which is then synthesized and/or compiled to program the FPGA 14. Alternatively, a schematic of the circuit may be drawn using a computer-aided drafting or design (CAD) program, which is then converted into FPGA 14 programmable code using electronic design automation (EDA) software tools, such as a schematic-capture program. The FPGA 14 may be physically programmed or configured using FPGA programming equipment, as is known in the art.

Figure 3:
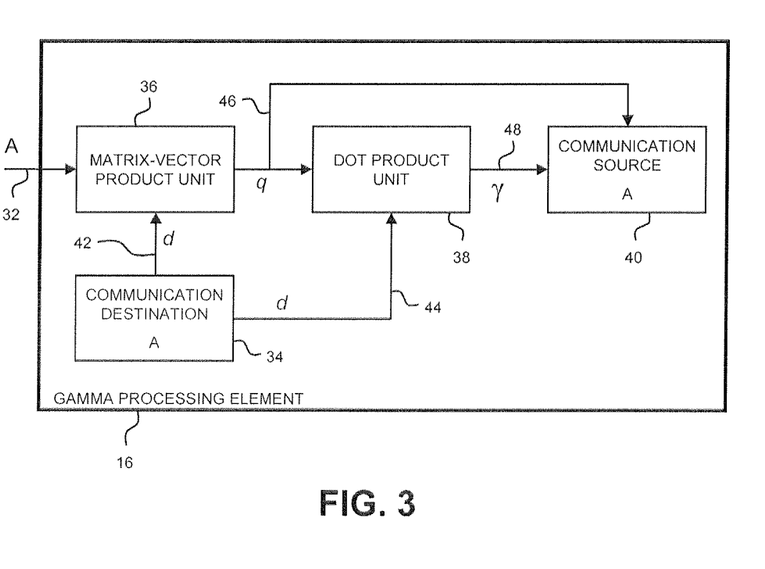
FIG. 3 is a schematic diagram of a gamma processing element that may be incorporated in the system of FIG. 1.

The gamma processing element 16 generally calculates the q vector, as listed in EQ. 5, and the third scalar, γ, as listed in EQ. 6. The gamma processing element 16 may receive the values of the A-matrix for a given row of the matrix from an external storage source. Thus, the gamma processing element 16 may include a matrix input 32. The gamma processing element 16 may also include a first communication destination element 34, a matrix-vector product unit 36, a dot product unit 38, and a first communication source element 40, as shown in FIG. 3.

In general, there may be a plurality of gamma processing elements 16, as resources allow, wherein each may calculate the matrix-vector product, the q-vector, for the A-matrix and the direction vector, $d^{(i)}$, for only a portion of the elements of a row of the A-matrix and the corresponding portion of the direction vector, $d^{(i)}$. The entire q-vector may be calculated in a parallel fashion using the plurality of matrix-vector product units 36 either synchronously or asynchronously. Furthermore, only a portion, corresponding to the portion of the q-vector, of the dot product of the q-vector and the direction vector, $d^{(i)}$, which is also known as the third scalar, $\gamma$, may be calculated by each gamma processing element 16. The dot product calculation may be finished by the alpha processing element 22, which accumulates all the partial sums from each gamma processing element 16.

The first communication destination element 34 generally receives the direction vector, $d^{(i)}$, data from the first communication source elements 40 and transmits the data to the matrix-vector product unit 36 and the dot product unit 38. The first communication destination element 34 may output a first direction vector input 42 and a second direction vector input 44.

The first communication destination element 34 may be formed from configurable logic elements 28 such as combinational logic gates, multiplexers, demultiplexers, crossbar or crossover or crosspoint switches, combinations thereof, and the like. The first communication destination element 34 may also be formed from configurable storage elements 30, such as first-in, first-out registers (FIFOs), single-port or multi-port RAM elements, memory cells, registers, latches, flip-flops, combinations thereof, and the like. The first communication destination element 34 may also include built-in components of the FPGA 14, and may further be implemented through one or more code segments of an HDL. In addition, the first communication destination element 34 may include a system such as the one described in "SWITCH-BASED PARALLEL DISTRIBUTED CACHE SYSTEM FOR MEMORY ACCESS ON RECONFIGURABLE COMPUTING PLATFORMS", U.S. patent application Ser. No. 11/969,003, filed Jan. 3, 2008, which is herein incorporated by reference in its entirety.

The matrix-vector product unit 36 generally computes the matrix-vector product of a given row of the A-matrix and the direction vector, $d^{(i)}$, according to EQ. 5. As mentioned above, each gamma processing element 16, and in turn, each matrix-vector product unit 36 may calculate only a portion of the entire matrix-vector product. The matrix-vector product unit 36 may receive the elements of the A-matrix through the matrix input 32. The matrix-vector product unit 36 may receive the direction vector, $d^{(i)}$, through the first direction vector input 42. The matrix-vector product unit 36 may also transmit a matrix-vector product output 46.

The matrix-vector product unit 36 may be formed from configurable logic elements 28 such as combinational logic gates, as well as adders, multipliers, shift registers, accumulators, combinations thereof, and the like. The matrix-vector product unit 36 may also be formed from configurable storage elements 30, such as FIFOs, single-port or multi-port RAM elements, memory cells, registers, latches, flip-flops, combinations thereof, and the like. The matrix-vector product unit 36 may also include built-in components of the FPGA 14, and may further be implemented through one or more code segments of an HDL.

The dot product unit 38 generally calculates the third scalar, $\gamma$, which is the dot product of the q-vector and the direction vector, $d^{(i)}$. The dot product unit 38 may calculate only a portion of the third scalar, $\gamma$, while the final dot product summation may be performed by the alpha processing element 22. The dot product unit 38 may transmit a dot product output 48.

The dot product unit 38 may be formed from configurable logic elements 28 such as combinational logic gates, as well as adders, multipliers, shift registers, accumulators, multiply-accumulators, combinations thereof, and the like. The dot product unit 38 may also be formed from configurable storage elements 30, such as FIFOs, single-port or multi-port RAM elements, memory cells, registers, latches, flip-flops, combinations thereof, and the like. The dot product unit 38 may also include built-in components of the FPGA 14, and may further be implemented through one or more code segments of an HDL.

The first communication source element 40 generally transmits the portion of the third scalar, $\gamma$, from the dot product unit 38 to the alpha processing element 22. The first communication source element 40 may also transmit the portion of the q-vector that has been calculated. The first communication source element 40 may receive the dot product output 48 from the dot product unit 38 and the matrix-vector product output 46 from the matrix-vector product unit 36.

The first communication source element 40 may be formed from configurable logic elements 28 such as combinational logic gates, multiplexers, demultiplexers, crossbar or crossover or crosspoint switches, combinations thereof, and the like. The first communication source element 40 may also be formed from configurable storage elements 30, such as FIFOs, single-port or multi-port RAM elements, memory cells, registers, latches, flip-flops, combinations thereof, and the like. The first communication source element 40 may also include built-in components of the FPGA 14, and may further be implemented through one or more code segments of an HDL. Similar to the first communication destination element 34, the first communication source element 40 may include a system such as the one described in "SWITCH-BASED PARALLEL DISTRIBUTED CACHE SYSTEM FOR MEMORY ACCESS ON RECONFIGURABLE COMPUTING PLATFORMS", U.S. patent application Ser. No. 11/969,003, filed Jan. 3, 2008, which is herein incorporated by reference in its entirety.

Figure 4:
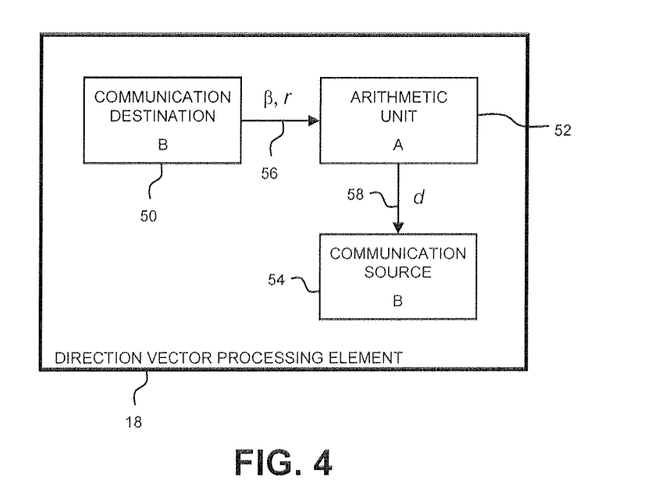
FIG. 4 is a schematic diagram of a direction vector processing element that may be incorporated in the system of FIG. 1.

The direction vector processing element 18 generally calculates the current iteration of the direction vector, $d^{(i)}$, as shown in EQ. 4. The direction vector, $d^{(i)}$, may include as many elements as the x-vector. Thus, there may be a plurality of direction vector processing elements 18, wherein each one calculates a portion of the direction vector. The direction vector processing element 18 may include a second communication destination element 50, a first arithmetic unit 52, and a second communication source element 54, as shown in FIG. 4.

The second communication destination element 50 generally receives data required to calculate the update of the direction vector, $d^{(i)}$. The second communication destination element 50 may receive elements of the direction vector, $d^{(i-1)}$, that were calculated in the last iteration. The second communication destination element 50 may receive these direction vector elements from the second communication source element 54 of the same direction vector processing element 18 or from a plurality of other direction vector processing elements 18. In addition, the second communication destination element 50 may receive a portion of the residual vector, $r^{(i)}$, and the second scalar, $\beta_i$. Thus, the second communication destination element 50 may include a second communication destination output 56 that supplies the residual vector, $r^{(i)}$, and the second scalar, $\beta_i$, values to the first arithmetic unit 52.

The second communication destination element 50 may include a similar structure and may perform a similar function to the first communication destination element 34. Therefore, the second communication destination element 50 may be formed from substantially the same components as the first communication destination element 34, discussed above.

The first arithmetic unit 52 generally updates the direction vector, $d^{(i)}$, as indicated in EQ. 4. The first arithmetic unit 52 may receive the last iteration of the direction vector, $d^{(i-1)}$, the last value of the second scalar, $\beta_{i-1}$, and the last iteration of the residual vector, $r^{(i-1)}$, through the second communication destination output 56. In various embodiments, the first arithmetic unit 52 may utilize internal storage, as described below, to store the last iteration of the direction vector, $d^{(i-1)}$. The first arithmetic unit 52 may calculate the direction vector, $d^{(i)}$, one row element at a time. The first arithmetic unit 52 may generate a first arithmetic output 58 to the second communication source element 54.

The first arithmetic unit 52 may be formed from configurable logic elements 28 such as combinational logic gates, as well as adders, multipliers, shift registers, accumulators, combinations thereof, and the like. The first arithmetic unit 52 may also be formed from configurable storage elements 30, such as FIFOs, single-port or multi-port RAM elements, memory cells, registers, latches, flip-flops, combinations thereof, and the like. The first arithmetic unit 52 may also include built-in components of the FPGA 14, and may further be implemented through one or more code segments of an HDL.

The second communication source element 54 generally transmits the updated direction vector, $d^{(i)}$, to direction vector processing elements 18 as well as gamma processing elements 16. The updated direction vector, $d^{(i)}$, may be used by direction vector processing elements 18, either the same direction vector processing element 18 or other direction vector processing elements 18, to calculate future iterations of the direction vector, $d^{(i+1)}$. The updated direction vector, $d^{(i)}$, may also be used by the gamma processing elements 16 to calculate the third scalar, $\gamma$, and the q vector. The second communication source element 54 may receive the first arithmetic output 58 from the first arithmetic unit 52.

The second communication source element 54 may include a similar structure and may perform a similar function to the first communication source element 40. Therefore, the second communication source element 54 may be formed from substantially the same components as the first communication source element 40, discussed above.

Figure 5:
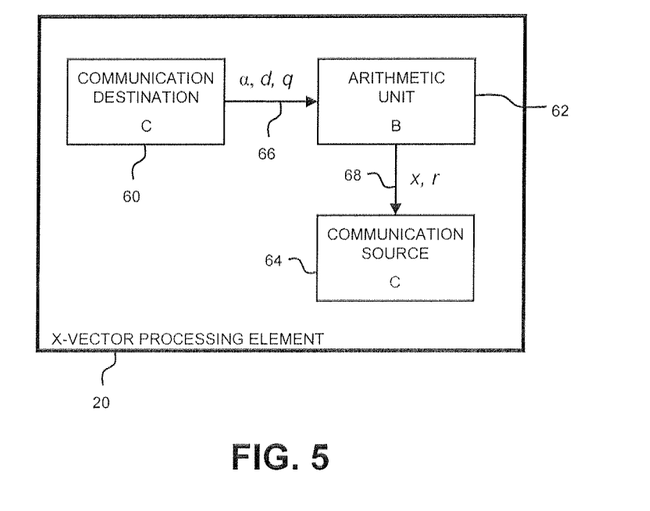
FIG. 5 is a schematic diagram of an x-vector processing element that may be incorporated in the system of FIG. 1.

The x-vector processing element 20 generally calculates the current iteration of the x-vector, as shown in EQ. 11. The x-vector processing element 20 may also calculate the current iteration of the residual vector, $r^{(i)}$, as shown in EQ. 8. To calculate the current iteration of the x-vector, the x-vector processing element 20 may utilize the last iteration of the x-vector, the last iteration of the fourth scalar, $\alpha$, and the last iteration of the direction vector, $d^{(i-1)}$. To calculate the current iteration of the residual vector, $r^{(i)}$, the x-vector processing element 20 may utilize the last iteration of the residual vector, $r^{(i-1)}$, the current iteration of the fourth scalar, $\alpha$, and the current iteration of the q-vector. The x-vector processing element 20 may include a third communication destination element 60, a second arithmetic unit 62, and a third communication source element 64, as shown in FIG. 5.

The third communication destination element 60 generally receives the current and the last iteration of the fourth scalar, $\alpha$, elements of the last iteration of the direction vector, $d^{(i-1)}$, and elements of the q-vector. The third communication destination element 60 may include a third communication destination output 66, which transmits the fourth scalar, $\alpha$, the direction vector, $d^{(i-1)}$, and the q-vector.

The third communication destination element 60 may include a similar structure and may perform a similar function to the first communication destination element 34. Therefore, the third communication destination element 60 may be formed from substantially the same components as the first communication destination element 34, discussed above.

The second arithmetic unit 62 generally calculates the current iteration of at least a portion of the x-vector, $x^{(i)}$, according to EQ. 11. The calculation of the current iteration of the entire x-vector may be performed by the plurality of x-vector processing elements 20, wherein the second arithmetic unit 62 of each x-vector processing element 20 calculates the current iteration of the x-vector, $x^{(i)}$, according to EQ. 11, for a portion of the rows of the vector. The second arithmetic unit 62 may retrieve the previous iteration of the x-vector, $x^{(i-1)}$, from internal storage, as discussed below.

The second arithmetic unit 62 may also calculate the current iteration of the residual vector, $r^{(i)}$, according to EQ. 8. Likewise with the x-vector, each x-vector processing element 20 may calculate the current iteration of the residual vector, $r^{(i)}$, for a portion of the rows of the vector. The second arithmetic unit 62 may receive the input of some data through the third communication destination output 66. Other data for the calculations may be retrieved from internal storage, as discussed below. The second arithmetic unit 62 may transmit $x^{(i)}$ and $r^{(i)}$ through a second arithmetic output 68.

The second arithmetic unit 62 may be formed from configurable logic elements 28 such as combinational logic gates, as well as adders, multipliers, shift registers, accumulators, combinations thereof, and the like. The second arithmetic unit 62 may also be formed from configurable storage elements 30, such as FIFOs, single-port or multi-port RAM elements, memory cells, registers, latches, flip-flops, combinations thereof, and the like. The second arithmetic unit 62 may also include built-in components of the FPGA 14, and may further be implemented through one or more code segments of an HDL.

The third communication source element 64 generally transmits the current iteration of the x-vector, $x^{(i)}$, and the current iteration of the residual vector, $r^{(i)}$, which are received from the second arithmetic unit 62 through the second arithmetic output 68.

The third communication source element 64 may include a similar structure and may perform a similar function to the first communication source element 40. Therefore, the third communication source element 64 may be formed from substantially the same components as the first communication source element 40, discussed above.

Figure 6:
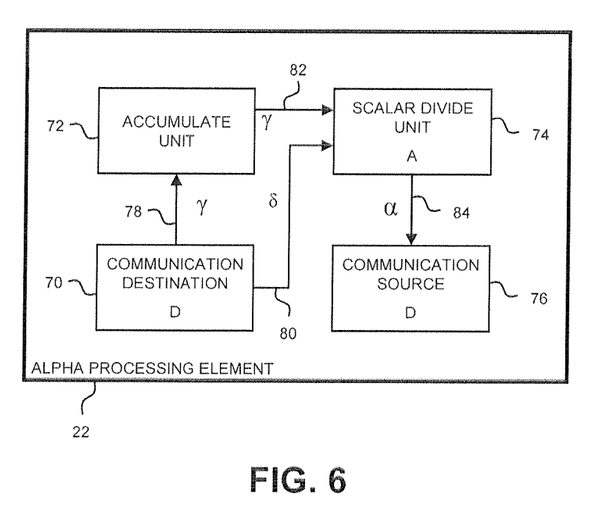
FIG. 6 is schematic diagram of an alpha processing element that may be incorporated in the system of FIG. 1.

The alpha processing element 22 generally calculates the fourth scalar, $\alpha$, as shown in EQ. 7. The alpha processing element 22 may include a fourth communication destination element 70, an accumulate unit 72, a first scalar divide unit 74, and a fourth communication source element 76, as shown in FIG. 6.

The fourth communication destination element 70 generally receives the data necessary to calculate the fourth scalar, $\alpha$, and may receive the third scalar, $\gamma$, from the gamma processing elements 16 either as a single number, or as portions that require to be accumulated to finish the calculation. In addition, the fourth communication destination element 70 may receive the first scalar, $\delta$, from the beta processing element 24. The fourth communication destination element 70 may transmit a fourth communication destination gamma output 78 and a fourth communication destination delta output 80.

The fourth communication destination element 70 may include a similar structure and may perform a similar function to the first communication destination element 34. Therefore, the fourth communication destination element 70 may be formed from substantially the same components as the first communication destination element 34, discussed above.

The accumulate unit 72 generally adds portions of the third scalar, γ, to complete the dot product calculation. The dot product calculation generally involves multiplying the corresponding elements of the two vectors together and adding all the products. The plurality of gamma processing elements 16 may each compute a partial sum of the products and then transmit the partial sums to the alpha processing element 22 to be added together. The accumulate unit 72 may receive the fourth communication destination gamma output 78 from the fourth communication destination element 70 and may transmit a gamma input 82.

The accumulate unit 72 may be formed from configurable logic elements 28 such as combinational logic gates, as well as adders, shift registers, accumulators, combinations thereof, and the like. The accumulate unit 72 may also be formed from configurable storage elements 30, such as FIFOs, single-port or multi-port RAM elements, memory cells, registers, latches, flip-flops, combinations thereof, and the like. The accumulate unit 72 may also include built-in components of the FPGA 14, and may further be implemented through one or more code segments of an HDL.

The first scalar divide unit 74 generally divides the first scalar, δ, by the third scalar, γ, in order to compute the fourth scalar, α, as shown in EQ. 7. The first scalar divide unit 74 may receive the first scalar, δ, through the fourth communication destination delta output 80 and may receive the third scalar, γ, through the gamma input 82. The first scalar divide unit 74 may transmit the fourth scalar, α, through an alpha output 84.

The first scalar divide unit 74 may be formed from configurable logic elements 28 such as combinational logic gates, as well as dividers, shift registers, combinations thereof, and the like. The first scalar divide unit 74 may also be formed from configurable storage elements 30, such as FIFOs, single-port or multi-port RAM elements, memory cells, registers, latches, flip-flops, combinations thereof, and the like. The first scalar divide unit 74 may also include built-in components of the FPGA 14, and may further be implemented through one or more code segments of an HDL.

The fourth communication source element 76 generally transmits the current iteration of the fourth scalar, α, as received from the first scalar divide unit 74 through the alpha output 84.

The fourth communication source element 76 may include a similar structure and may perform a similar function to the first communication source element 40. Therefore, the fourth communication source element 76 may be formed from substantially the same components as the first communication source element 40, discussed above.

Figure 7:
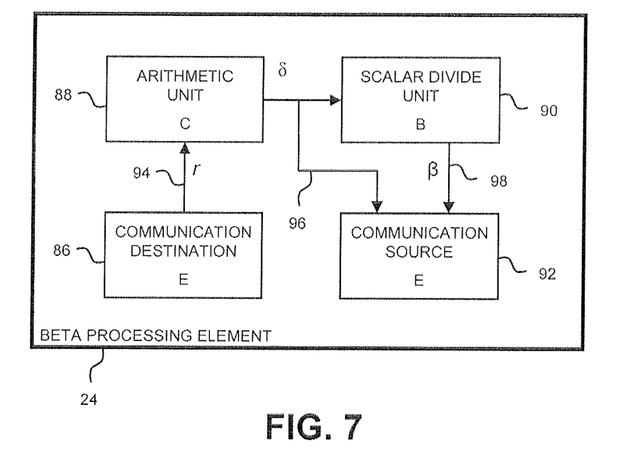
FIG. 7 is a schematic diagram of a beta processing element that may be incorporated in the system of FIG. 1.

The beta processing element 24 generally calculates the update to the second scalar, β, as shown in EQ. 10. To perform the calculation of the update of the second scalar, β, the beta processing element 24 may also calculate the current iteration of the first scalar, $\delta_i$, which may utilize the current iteration of the residual vector, $r^{(i)}$. The beta processing element 24 may include a fifth communication destination element 86, a third arithmetic unit 88, a second scalar divide unit 90, and a fifth communication source element 92, as shown in FIG. 7.

The fifth communication destination element 86 generally receives the current iteration of the residual vector, $r^{(i)}$. The fifth communication destination element 86 may include a fifth communication destination output 94 to transmit the residual vector, $r^{(i)}$.

The fifth communication destination element 86 may include a similar structure and may perform a similar function to the first communication destination element 34. Therefore, the fifth communication destination element 86 may be formed from substantially the same components as the first communication destination element 34, discussed above.

The third arithmetic unit 88 generally calculates the current iteration of the first scalar, $\delta_i$, which is the dot product of the current iteration of the residual vector, $r^{(i)}$, with itself, as seen in EQ. 9. The third arithmetic unit 88 may receive the residual vector through the fifth communication destination output 94. The third arithmetic unit 88 may transmit the current iteration of the first scalar, $\delta_i$, through a third arithmetic output 96.

The third arithmetic unit 88 may be formed from configurable logic elements 28 such as combinational logic gates, as well as adders, multipliers, shift registers, accumulators, combinations thereof, and the like. The third arithmetic unit 88 may also be formed from configurable storage elements 30, such as FIFOs, single-port or multi-port RAM elements, memory cells, registers, latches, flip-flops, combinations thereof, and the like. The third arithmetic unit 88 may also include built-in components of the FPGA 14, and may further be implemented through one or more code segments of an HDL.

The second scalar divide unit 90 generally divides the current iteration of the first scalar, $\delta_i$, by the last iteration of the first scalar, $\delta_{i-1}$, in order to compute the second scalar, $\beta_i$, as shown in EQ. 10. The second scalar divide unit 90 may receive the current iteration of the first scalar, $\delta_i$, through the third arithmetic output 96. The second scalar divide unit 90 may include internal storage, as discussed below, to store the last iteration of the first scalar, $\delta_{i-1}$. The second scalar divide unit 90 may transmit the second scalar, $\beta_i$, through a beta output 98.

The second scalar divide unit 90 may be formed from configurable logic elements 28 such as combinational logic gates, as well as dividers, shift registers, combinations thereof, and the like. The second scalar divide unit 90 may also be formed from configurable storage elements 30, such as FIFOs, single-port or multi-port RAM elements, memory cells, registers, latches, flip-flops, combinations thereof, and the like. The second scalar divide unit 90 may also include built-in components of the FPGA 14, and may further be implemented through one or more code segments of an HDL.

The fifth communication source element 92 generally transmits the current iteration of the first scalar, $\delta_i$, and the second scalar, $\beta_i$. The fifth communication source element 92 may receive the current iteration of the first scalar, $\delta_i$, through the third arithmetic output 96 and may receive the second scalar, $\beta_i$, through the beta output 98.

The fifth communication source element 92 may include a similar structure and may perform a similar function to the first communication source element 40. Therefore, the fifth communication source element 92 may be formed from substantially the same components as the first communication source element 40, discussed above.

The inter FPGA link 26 generally allows communication from the components, such as the gamma processing elements 16, the direction vector processing elements 18, or the x-vector processing elements 20, on one FPGA 14 to the components on another FPGA 14. The inter FPGA link 26 may buffer the data and add packet data, serialize the data, or otherwise prepare the data for transmission.

The inter FPGA link 26 may include buffers in the form of flip-flops, latches, registers, SRAM, DRAM, and the like, as well as shift registers or serialize-deserialize (SERDES) components. The inter FPGA link 26 may be a built-in functional FPGA block or may be formed from one or more code segments of an HDL or one or more schematic drawings. The inter FPGA link 26 may also be compatible with or include Gigabit Transceiver (GT) components, as are known in the art. The inter FPGA link 26 may receive data from the first through the fifth communication source elements 40, 54, 64, 76, 92 and may transmit data to the first through the fifth communication destination elements 34, 50, 60, 70, 86. The inter FPGA link 26 may couple to an inter FPGA bus 100 to communicate with another FPGA 14.

The inter FPGA bus 100 generally carries data from one FPGA 14 to another FPGA 14 and is coupled with the inter FPGA link 26 of each FPGA 14. The inter FPGA bus 100 may be a single-channel serial line, wherein all the data is transmitted in serial fashion, a multi-channel (or multi-bit) parallel link, wherein different bits of the data are transmitted on different channels, or variations thereof, wherein the inter FPGA bus 100 may include multiple lanes of bi-directional data links. The inter FPGA bus 100 may be compatible with GTP components included in the inter FPGA link 26. The inter FPGA link 26 and the inter FPGA bus 100 may also be implemented as disclosed in U.S. Pat. No. 7,444,454, issued Oct. 28, 2008, which is hereby incorporated by reference in its entirety.

The system 10 may function as follows. The system 10 may receive an initial guess of the x-vector from an external source. Furthermore, the system 10 may receive initial values of the residual vector, r, and the first scalar, $\delta$, as shown in EQ. 2 and EQ. 3.

Given the initial value of the residual vector, r, and that it may be assumed that the initial value of the second scalar, $\beta$, is 0, the first iteration of the direction vector, d, may be calculated, as given by EQ. 4, by the direction vector processing elements 18, shown in FIG. 4, with each direction vector processing element 18 calculating the iteration of a portion of the rows of the direction vector, d. The direction vector processing elements 18 may store current iterations of the direction vector, $d^{(i)}$, for processing future iterations.

The gamma processing elements 16, seen in FIG. 3, may receive the direction vector data from the direction vector processing elements 18. The gamma processing elements 16 may also receive portions of the A-matrix from an external source. Given the A-matrix and the direction vector, d, the matrix-vector product unit 36 may calculate a portion of the q-vector, from EQ. 5. The dot product unit 38 may receive the q-vector from the matrix-vector product unit 36 and the direction vector, d, from the first communication destination element 34 and calculate a portion of the third scalar, $\gamma$, which is the dot product of the q-vector and the direction vector, d, from EQ. 6.

The alpha processing element 22, shown in FIG. 6, may receive the portions of the third scalar, $\gamma$, from the plurality of gamma processing elements 16, and the accumulate unit 72 may add all the portions together to complete the dot product calculation of the third scalar, $\gamma$. The first scalar divide unit 74 may receive the third scalar, $\gamma$, from the accumulate unit 72 and the first scalar, $\delta$, from the fourth communication destination element 70, and may calculate the fourth scalar, $\alpha$, according to EQ. 7. During the first iteration, the first scalar divide unit 74 may use the initial value of the first scalar, $\delta$, as given by EQ. 3.

Each x-vector processing element 20, as seen in FIG. 5, may receive the fourth scalar, $\alpha$, and a portion of the q-vector to compute a corresponding portion of the residual vector, r, according to EQ. 8. The initial value of the residual vector, $r^{(0)}$, may be received from an external source, and may be used to calculate the second iteration. Each x-vector processing element 20 may also receive a portion of the direction vector, d, from the direction vector processing element 18. Using the fourth scalar, $\alpha$, the direction vector, d, and the last iteration of the x-vector, the x-vector processing element 20 may calculate a portion of the current iteration of the x-vector, as shown in EQ. 11. The x-vector processing element 20 may also store calculated values of the current iterations of both the residual vector, r, and the x-vector.

The beta processing element 24, shown in FIG. 7, may receive the residual vector, r, from the x-vector processing elements 20. The third arithmetic unit 88 may calculate the first scalar, $\delta$, which is the dot product of the residual vector, r, as given by EQ. 9. The initial value of the first scalar, $\delta$, may be calculated from the initial value of the residual vector, $r^{(0)}$. The second scalar divide unit 90 may receive the current iteration of the first scalar, $\delta$, from the third arithmetic unit 88. The previous iteration of the first scalar, $\delta_{i-1}$, may be stored in the second scalar divide unit 90 and may be utilized in order to calculate the second scalar, $\beta$, as given by EQ. 10.

The calculations of EQs. 4-11 may continue, as described above, asynchronously and in parallel by the processing elements 16, 18, 20, 22, 24. The system 10 may calculate the solution to the x-vector for a fixed number of iterations and then transmit the last iteration of the x-vector as the solution. Alternatively, the system 10 may stop iterating when a convergence criteria is met, such as the magnitude of the residual vector becoming small enough. The convergence criteria may be evaluated by a component in the system or may be evaluated externally, such that the system 10 may receive a signal indicating that a solution has been found and to cease calculations.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A system for a conjugate gradient iterative linear solver that calculates the solution to a matrix equation, the system comprising:
   a field programmable gate array (FPGA), including a plurality of configurable logic elements and a plurality of configurable storage elements;
   a plurality of gamma processing elements formed from configurable logic elements and configurable storage elements, and configured to receive an A-matrix and a direction vector, and to calculate a q-vector and a gamma scalar;
   a plurality of direction vector processing elements formed from configurable logic elements and configurable storage elements, and configured to receive a beta scalar and a residual vector, and to calculate the direction vector;
   a plurality of x-vector processing elements formed from configurable logic elements and configurable storage elements, and configured to receive an alpha scalar, the direction vector, and the q-vector, and to calculate an x-vector and the residual vector;
   an alpha processing element formed from configurable logic elements and configurable storage elements, and configured to receive the gamma scalar and a delta scalar, and to calculate the alpha scalar; and
   a beta processing element formed from configurable logic elements and configurable storage elements, and configured to receive the residual vector, and to calculate the delta scalar and the beta scalar.

2. The system of claim 1, wherein the q-vector is a product of the A-matrix and the direction vector.

3. The system of claim 1, wherein the gamma scalar is a dot product of the q-vector and the direction vector.

4. The system of claim 1, wherein the direction vector is a sum of the residual vector and a product of the beta scalar and a previous iteration of the direction vector.

5. The system of claim 1, wherein the residual vector is a difference of a previous iteration of the residual vector and a product of the alpha scalar and the q-vector.

6. The system of claim 1, wherein the x-vector is a sum of a previous iteration of the x-vector and a product of the alpha scalar and the direction vector.

7. The system of claim 1, wherein the alpha scalar is a quotient of the delta scalar and the gamma scalar.

8. The system of claim 1, wherein the delta scalar is a dot product of the residual vector with itself.

9. The system of claim 1, wherein the beta scalar is a quotient of a current iteration of the delta scalar and a previous iteration of the delta scalar.

10. The system of claim 1, wherein each gamma processing element receives a portion of the A-matrix and a portion of the direction vector, and calculates a portion of the q-vector and a portion of the gamma scalar.

11. The system of claim 1, wherein each direction vector processing element receives the beta scalar and a portion of the residual vector, and calculates a portion of the direction vector.

12. The system of claim 1, wherein each x-vector processing element receives the alpha scalar, a portion of the q-vector, and a portion of the direction vector, and calculates a portion of the x-vector and a portion of the residual vector.

13. The system of claim 1, wherein the residual vector initially is a difference between a b-vector and a product of the A-matrix and the x-vector.

14. A system for a conjugate gradient iterative linear solver that calculates the solution to a matrix equation, the system comprising:
- a plurality of field programmable gate arrays (FPGAs), including a plurality of configurable logic elements and a plurality of configurable storage elements;
- a plurality of gamma processing elements formed from configurable logic elements and configurable storage elements, and configured to receive an A-matrix and a direction vector, and to calculate a q-vector and a gamma scalar;
- a plurality of direction vector processing elements formed from configurable logic elements and configurable storage elements, and configured to receive a beta scalar and a residual vector, and to calculate the direction vector;
- a plurality of x-vector processing elements formed from configurable logic elements and configurable storage elements, and configured to receive an alpha scalar, the direction vector, and the q-vector, and to calculate an x-vector and the residual vector;
  - an alpha processing element formed from configurable logic elements and configurable storage elements, and configured to receive the gamma scalar and a delta scalar, and to calculate the alpha scalar;
- a beta processing element formed from configurable logic elements and configurable storage elements, and configured to receive the residual vector, and to calculate the delta scalar and the beta scalar; and
- a plurality of inter FPGA links, each inter FPGA link included within one FPGA and configured to allow communication from one FPGA to another FPGA.

15. The system of claim 14, wherein the q-vector is a product of the A-matrix and the direction vector.

16. The system of claim 14, wherein the gamma scalar is a dot product of the q-vector and the direction vector.

17. The system of claim 14, wherein the direction vector is a sum of the residual vector and a product of the beta scalar and a previous iteration of the direction vector.

18. The system of claim 14, wherein the residual vector is a difference of a previous iteration of the residual vector and a product of the alpha scalar and the q-vector.

19. The system of claim 14, wherein the x-vector is a sum of a previous iteration of the x-vector and a product of the alpha scalar and the direction vector.

20. The system of claim 14, wherein the alpha scalar is a quotient of the delta scalar and the gamma scalar.

21. The system of claim 14, wherein the delta scalar is a dot product of the residual vector with itself.

22. The system of claim 14, wherein the beta scalar is a quotient of a current iteration of the delta scalar and a previous iteration of the delta scalar.

23. The system of claim 14, wherein each gamma processing element receives a portion of the A-matrix and a portion of the direction vector, and calculates a portion of the q-vector and a portion of the gamma scalar.

24. The system of claim 14, wherein each direction vector processing element receives the beta scalar and a portion of the residual vector, and calculates a portion of the direction vector.

25. The system of claim 14, wherein each x-vector processing element receives the alpha scalar, a portion of the q-vector, and a portion of the direction vector, and calculates a portion of the x-vector and a portion of the residual vector.

26. The system of claim 14, wherein the residual vector initially is a difference between a b-vector and a product of the A-matrix and the x-vector.

27. A system for a conjugate gradient iterative linear solver that calculates the solution to a matrix equation, the system comprising:
- a plurality of field programmable gate arrays (FPGAs), including a plurality of configurable logic elements and a plurality of configurable storage elements;
- a plurality of gamma processing elements formed from configurable logic elements and configurable storage elements, and configured to receive an A-matrix and a direction vector, and to calculate a q-vector and a gamma scalar, wherein the q-vector is a product of the A-matrix and the direction vector, and the gamma scalar is a dot product of the q-vector and the direction vector;
- a plurality of direction vector processing elements formed from configurable logic elements and configurable storage elements, and configured to receive a beta scalar and a residual vector, and to calculate the direction vector, wherein the direction vector is a sum of the residual vector and a product of the beta scalar and a previous iteration of the direction vector;
- a plurality of x-vector processing elements formed from configurable logic elements and configurable storage elements, and configured to receive an alpha scalar, the direction vector, and the q-vector, and to calculate an x-vector and the residual vector, wherein the x-vector is a sum of a previous iteration of the x-vector and a product of the alpha scalar and the direction vector, and the residual vector is a difference of a previous iteration of the residual vector and a product of the alpha scalar and the q-vector;
- an alpha processing element formed from configurable logic elements and configurable storage elements, and configured to receive the gamma scalar and a delta scalar, and to calculate the alpha scalar, wherein the alpha scalar is a quotient of the delta scalar and the gamma scalar;

a beta processing element formed from configurable logic elements and configurable storage elements, and configured to receive the residual vector, and to calculate the delta scalar and the beta scalar, wherein the delta scalar is a dot product of the residual vector with itself, and the beta scalar is a quotient of a current iteration of the delta scalar and a previous iteration of the delta scalar; and a plurality of inter FPGA links, each inter FPGA link included within one FPGA and configured to allow communication from one FPGA to another FPGA.

28. The system of claim 27, wherein the residual vector initially is a difference between a b-vector and a product of the A-matrix and the x-vector.

* * * * *